United States Patent Office 3,515,740
Patented June 2, 1970

---

3,515,740
CYANO CYCLOHEXENYL COMPOUNDS
Orville D. Frampton, 58 W. Charlotte Ave., Wyoming, Ohio 45215, and Julian Feldman, 7511 Sagamore Drive, Cincinnati, Ohio 45236
No Drawing. Filed Feb. 20, 1967, Ser. No. 617,042
Int. Cl. C07c *121/00*
U.S. Cl. 260—464  9 Claims

ABSTRACT OF THE DISCLOSURE

Bifunctional cyclohexenyl and cyclohexanyl quaternary carbon compounds such as 4-cyano, 4-(2-cyanoethyl) cyclohexene; 4 - carbamyl, 4 - (2-carbamylethyl) cyclohexene; and 1-cyano, 1-(2-cyanoethyl) cyclohexane. These compounds are useful for the preparation of spasmolytics, insecticides, pesticides and soporifics. The bifunctional compounds are prepared by the reaction of 1,1-disubstituted ethylene compounds (e.g., 2,4-dicyanobutene-1) and 1,3-diene (e.g., butadiene) in a 1 to 1 mole ratio at a temperature of about 50° to 200° C.

---

The present invention relates to novel bifunctional cyclohexenyl and cyclohexanyl quaternary carbon compounds and to their method of preparation. More particularly, the invention pertains to organic compounds having the general Formula I:

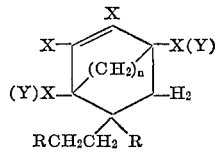

wherein each R may be the same or different and is selected from the group consisting of CN, COOH, COOR', CH=NH, $CH_2NH_2$, CHO, COCl, COR', $CH_2OH$, $CH_2NCS$, and $CONH_2$, wherein R' is an alkyl group having from 1 to 18 carbon atoms; and where the double bond in the cyclohexene ring may be replaced by a single bond through hydrogenation. Each X or Y in I may be the same or different and is selected from the group consisting of hydrogen, halogen (e.g., chloro or bromo), lower alkyl (e.g., methyl, ethyl, or propyl) having from 1 to 8 carbon atoms, aryl (e.g., p-tolyl, phenyl), haloalkyl (e.g., chloromethyl), alkylene (e.g., butylene, pentylene, etc.), alkoxy (e.g., methoxy, etc.), alkyleneoxy (e.g., ethyleneoxy, etc.), and COR' wherein R' is as hereinbefore defined. The X groups on adjacent carbon atoms in I may be interconnected by hydrocarbon, ether, or ester bridges to form a variety of ring compounds and Y is present only when $n=0$; and $n$ is an integer from 0 to 3.

In general, the novel organic compounds of this invention are prepared by the reaction of 1,1-disubstituted ethylene compounds with 1,3-dienes. The former has the general Formula II:

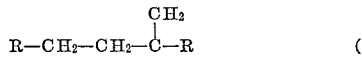  (II)

wherein each R is as hereinabove defined. Illustrative compounds include 2,4 - dicyanobutene-1, α-methylene glutaric acid anhydride, α-methylene glutaric acid, dimethyl-α-methylene glutarate, α-methylene glutaramide, half amides of α-methylene glutaric acid or its esters, 1,5-diamino-2-methylene pentane, and the like.

The 1,3-diene has the general Formula III:

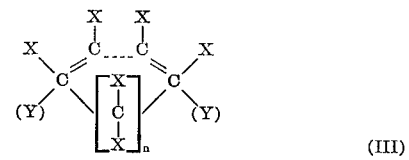  (III)

wherein X and Y are each as hereinbefore defined; and wherein $n$ is an integer from 0 to 3. Illustrative dienes include butadiene, 2,3-dimethyl butadiene, 3-n-propylhexadiene, isoprene, cyclopentadiene, hexachlorocyclopentadiene, hexachlorobutadiene, α-vinylnaphthalene, anthracene, chloroprene, 2-methoxy butadiene, fulvene, 1,4-di(bromomethyl) butadiene, etc.

In carrying out the process of this invention the 1,1-disubstituted bifunctional ethylene compound is reacted with the 1,3-diene in about a 1 to 1 mole ratio, although the mole ratio may vary from about 0.8 to 1 to about 1.2 to 1. A large excess of either reactant is avoided since each is capable of thermal oligomerization thereby leading to the formation of undesirable by-products. In some instances it is disadvantageous to carry out the reaction in the presence of an inert solvent or reaction medium. Suitable solvents include toluene, xylene, nitrobenzene, benzonitrile, carbon tetrachloride, and the like. The use of a polar solvent is preferred since it was found that such solvents resulted in an increased reaction rate. It will be understood that a solvent need only be employed if the ethylene compound and the 1,3-diene reactants are immiscible under reaction conditions. The use of minor amounts of a conventional polymerization inhibitor in the reaction mixture is also contemplated.

The temperature of reaction should be in the range of 50°–200° C., preferably about 110°–160° C. High reaction temperatures should be avoided because these promote dissociation of the adduct. The reaction time should be in the range of 1–30 hours, but preferably 5–15 hours. Pressure need be only sufficient to maintain a liquid phase in the reaction mixture. A closed vessel is necessary where the reactants or solvents are highly volatile under reaction conditions. Autogenous pressure developed in the closed reactor is not harmful. The reaction time may vary widely from about 2 to 24 hours, for example. The desired product may be recovered from the resulting reaction product mixture by conventional procedures such as distillation and/or crystallization. Generally the preferred recovery procedure involves an initial separation of the volatile solvent, if present.

The cyclohexenyl compounds produced in accordance with the process described above may be readily employed for the preparation of other useful bifunctional quaternary carbon compounds by known procedures such as catalytic hydrogenation of the olefinic and/or nitrile groups or hydrolysis of the nitrile groups to prepare the corresponding acids, acid amides, or imides. For example, the cyclohexenyl group may be hydrogenated in the presence of a supported palladium catalyst to obtain a cycloalkyl substituent. The nitrile groups, on the other hand, may be hydrolyzed by treatment with sodium or potassium hydroxide to yield carboxylic acid or amide derivatives. It is also possible to subject the nitrile groups to hydrogenation in the presence of a Raney nickel or cobalt catalyst to obtain the amine or imine derivatives.

The novel bifunctional cyclohexenyl quaternary compounds of this invention have various utilities. The 1-substituted cyclohexanyl cyanide derivatives, for example are useful as intermediates for the preparation of certain spasmolytic compounds as reported by Tilford et al., JACS 71, 1705-9 (1949), for the 1-substituted cycloalkyl cyanides. Thus, 4-carbamyl, 4-(2-carboxyethyl) cyclohexene may be converted to β-diethylamino ethyl 1-n-amyl cyclohexane carboxylate (IV) Tilford et al., J.A.C.S. 71, 1705-9 (1949) Table I, No. 8, a known spasmolytic agent by catalytic hydrogenation of the olefinic bond followed by esterification to yield an α,α,α-trisubstituted acetamide with one substituent containing a terminal ester group. Reaction of this type compound with Grignard reagents is known to convert the acetamide group to nitrile. (Kharasch & Reinmuth, Grignard Reactions of Non Metallic Substance, p. 871, Prentice Hall, Inc., New York, 1954.) The ester group meanwhile converts to a ketone group. Selective hydrogenation of the keto group (catalytically or otherwise) yields 1-n amyl, 1-cyano cyclohexane from which IV has been prepared and tested by Tilford et al. The bifunctional cyclohexenyl compounds are also useful as intermediates for the preparation of insecticides, pesticides, soporifics, or to introduce fire retardant properties into polymers where the 1,3-diene is a chlorinated diene. Furthermore, the cyclohexenyl compounds of this invention may be employed to form polymers.

The 4-cyano, 4-(2-cyanoethyl) cyclohexene; 3,6-endomethylene 4-cyano, 4-(2-cyanoethyl) cyclohexene; 1-methyl, 4-cyano, 4-(2-cyanoethyl) cyclohexene; 2-methyl, 4-cyano, 4-(2-cyanoethyl) cyclohexene; and the 3,6-endomethylene 4-cyano, 4-(2-cyanoethyl) hexachlorocyclohexene are all convertible to saturated or unsaturated diamines, diacids, and dialcohols through appropriate known reactions of the nitrile groups. These compounds are suitable monomers for preparing useful polymers. Thus polyesters are prepared from the diacids and other diols, and from the diols and other acids, or from the instant diacids and diols. Where the chlorine content is high, such polymers are fire retardants and can impart this quality into other useful polyesters by known copolymerization techniques. Similarly, polyamides are possible to obtain by reacting the diacids with hexamethylene diamine or other diamines, or by reacting the instant diamines with sebacic acid, or adipic acid, or the instant diacids. The inclusion of clorine groups also imparts fire retardant qualities into the polyamides. Such polyamides are useful for fibers or other articles.

The invention will be more fully understood by reference to the following illustrative embodiments.

EXAMPLE I 4-cyano, 4-(2-cyanoethyl)cyclohexene

*Run A.*—Butadiene was distilled into 2,4-dicyanobutene-1 at −10° C. until an equal volume was added. 7 ml. of this mixture was introduced by suction into an evacuated pre-cooled (in solid CO$_2$) 10-ml. valved stainless steel reactor containing 0.0005 gram of p-tertiary butyl catechol. The reactor was agitated to mix the contents, then placed in an oil bath at 140° C. for 14 hours. After cooling, the mixture was removed and distilled under reduced pressure of 1 mm. Hg in a 10 cm. vacuum jacketed Vigreaux column, yielding 4-cyano, 4-(2-cyanoethyl)cyclohexene, having a boiling point of 128-129° C. at 1 mm. Hg pressure and melting at 31°-32° C.

*Analysis.*— Found (percent): C, 74.87; H, 7.55; N, 17.49. Theory (percent): C, 75.00; H, 7.50; N, 17.50.

*Run B.*—Following the procedure of Run A but substituting an equivalent amount of α-methylene glutaramide for 2,4-dicyanobutene-1, there was obtained the corresponding diamide derivative, 4-carbamyl, 4-(2-carbamylethyl)cyclohexene.

*Run C.*—Following the procedure of Run A but substituting an equivalent amount of 1-n-propyl hexadiene-1,3 for butadiene there was obtained the corresponding 2-n propyl, 3-ethyl, 4-cyano, 4-(2-cyanoethyl)cyclohexene.

EXAMPLE II 4-cyano, 4-(2-cyanoethyl)cyclohexane 4.7 grams of 4-cyano, 4-(2-cyanoethyl)cyclohexene was dissolved in 20 ml. of ethanol and mixed with 0.06 gram of 5% palladium metal on carbon catalyst and the mixture subjected to hydrogenation under 40-50 p.s.i. hydrogen for 7½ hours in a Parr Hydrogenation Apparatus. The hydrogen absorption was 111% of theoretical for one olefinic bond, 80% being absorbed in one hour. The mixture was filtered and the solvent was evaporated on the steam bath. The resulting product crystallized on standing to yield 4-cyano, 4-(2-cyanoethyl)cyclohexane. The melting point was 31°-33° C.

*Analysis.*—Found (percent): C, 74.20; H, 8.80; N, 17.42. Theory (percent): C, 74.07; H, 8.64; N, 17.28.

EXAMPLE III 4-carbamyl, 4-(2-carboxyethyl)cyclohexene 4.85 grams of crystalline 4-cyano, 4-(2-cyanoethyl) cyclohexene was hydrolyzed with 3.6 grams of NaOH dissolved in a mixture of 4.6 grams of water and 12 ml. of ethanol at reflux temperature for 8 hours. After about 20 minutes, a solid separated from the solution which dissolved on addition of 15 ml. of ethanol. The mixture was evaporated to remove solvent, then slurried with water and acidified with HCl. Crystallization from the solution, washing the crystals with water, then air drying them overnight yielded 1.59 grams of 4-carbamyl, 4-(2-carboxyethyl)cyclohexene (M.P. 158°-159° C.).

*Analysis.*—Found (percent): C, 660.93; H, 7.64; N, 7.22; O, 24.31. Theory (percent): C, 60.91; H, 7.61; N, 7.11; O, 24.36.

EXAMPLE IV 4-iminomethyl, 4-(3-iminopropyl)cyclohexene 14.3 grams of the 4-cyano, 4-(2-cyanoethyl)cyclohexene in 50 ml. of absolute ethanol and 13.5 grams of (liquid) NH$_3$ were hydrogenated with stirring in a 250-ml. Magnastir autoclave using 3.7 grams of Raney cobalt catalyst at 3500 p.s.i. hydrogen and 100° C. for about 21 hours. The theoretical amount of hydrogen was absorbed.

Filtering the catalyst and evaporation of solvent yielded 1.48 grams of 4-iminomethyl-4-(3-iminopropyl) cyclohexene having a M.P. of 170° C.

EXAMPLE V 3,6-endomethylene, 4-cyano, 4-(2-cyanoethyl)cyclohexene 75 ml. of 2-4-dicyanobutene-1 and 47 ml. of freshly distilled cyclopentadiene (prepared by distillation of bicyclopentadiene with iron filings present) were transferred to a 200-ml. stainless steel pressure reactor (packed in Dry Ice), the system purged with nitrogen, closed by means of a valve, and heated in an oil bath at 150° C. for about 16 hours.

The reaction mixture was distilled through a jacketed 10-cm. Minilab Vigreux column, and yielded 3,6-endomethylene 4-cyano, 4-(2-cyanoethyl)cyclohexene (M.P. 43°-46° C.). According to other nomenclature rules, this product could be identified as 2-cyano, 2-(2-cyanoethyl) norbornene.

*Analysis.*—Found (percent): C, 76.62; H, 7.02; N, 16.52. Theory (percent): C, 76.74; H, 6.98; N, 16.28.

EXAMPLE VI 3,6-endomethylene, 4-carbamyl, 4-(2-carboxyethyl) cyclohexene 6.66 grams of 3,6-endomethylene-4-cyano, 4-(2-cyanoethyl)cyclohexene were hydrolyzed under inert atmosphere with 3.5 grams of NaOH dissolved in 5 ml. of water and 15 ml. of ethanol at reflux temperature for 14½ hours. The hydrolysate was acidified to pH 3 with HCl and a white crystalline substance, 3,6-endomethylene, 4-carbamyl, 4-(2-carboxyethyl)cyclohexene, 2.47 g., M.P. 109°–125° C. (with decomposition) was obtained. According to other nomenclature rules, this product could be identified as 2 - carbamyl, 2 - (2 - carboxyethyl) norbornene.

EXAMPLE VII 1-methyl, 4-cyano, 4-(2-cyanoethyl)cyclohexene and the 2-methyl isomer 75 ml. of freshly distilled isoprene and 75 ml. of 2,4-dicyanobutene-1 were placed in the cold (packed in solid $CO_2$) 200-ml. valved stainless steel reactor; then the reactor was purged with oxygen-free nitrogen and closed. The reactor was placed in the oil bath at 148° C. for 12 hours, after which the reaction mixture was distilled and the distillate fractionated to yield 1-methyl, 4-cyano, 4-(2-cyanoethyl)cyclohexene and 2-methyl, 4-cyano, 4-(2-cyanoethyl)cyclohexene.

*Analysis.*—Found (percent): C, 75.90; H, 8.06; N, 16.11. Theory (percent): C, 75.86; H, 8.04; N, 16.09.

The melting point was 43°–56° C.

EXAMPLE VIII 3,6-endomethylene, 4-cyano, 4-(2-cyanoethyl)hexachloro cyclohexene 82 grams of hexachlorocyclopentadiene, 32 grams of 2,4-dicyanobutene-1 and 36 ml. of toluene were mixed giving 150 ml. of a homogeneous liquid which was placed in a stainless steel reactor. The reactor was closed and immersed in an oil bath at 150° C. for 18 hours. The reaction mixture was distilled at atmospheric pressure in a jacketed Vigreux column and the bulk of the solvent was removed at 112° C., keeping the pot temperature below 150° C. Further traces of toluene were removed by distillation at 1 mm. Hg pressure, keeping the pot temperature below 170° C., yielding 3,6-endomethylene, 4-cyano, 4-(2-cyanoethyl)hexachloro cyclohexene. According to other nomenclature rules this product could be identified as 2-cyano, 2-(2 - cyanoethyl) - 1,4,5,6,7,7 - hexachloro norbornene.

While particular embodiments of this invention are shown above, it will be understood that the invention is obviously subject to variations and modifications without departing from its broader aspects.

What is claimed is:
1. A compound of the formula

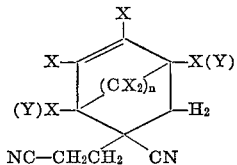

wherein each X or Y is selected from the group consisting of hydrogen, chloro, bromo, and a lower alkyl group, and wherein Y is present only when $n=0$; and $n$ is an integer from 0 to 3.

2. 4-cyano, 4-(2-cyanoethyl)cyclohexene.
3. 3-ethyl, 2-n-propyl, 4-cyano, 4-(2-cyanoethyl)cyclohexene.
4. 3,6-endomethylene-4-cyano, 4-(2 - cyanoethyl)cyclohexene.
5. 2-methyl, 4-cyano, 4-(2-cyanoethyl)cyclohexene.
6. 1-methyl-4-cyano, 4-(2-cyanoethyl)cyclohexene.
7. 3,6-endomethylene-4-cyano, 4-(2 - cyanoethyl)hexachlorocyclohexene.
8. 4-cyano, 4-(2-cyanoethyl)hexachlorocyclohexene.
9. 4-cyano, 4-(2-cyanoethyl)cyclohexane.

References Cited

UNITED STATES PATENTS

| | | | |
|---|---|---|---|
| 2,957,906 | 10/1960 | Erickson et al. | 260—464 X |
| 3,168,550 | 2/1965 | Blumenthal | 260—464 |
| 3,304,167 | 2/1967 | Buntin et al. | 260—464 X |

FOREIGN PATENTS

| | | |
|---|---|---|
| 506,453 | 10/1954 | Canada. |

JOSEPH P. BRUST, Primary Examiner

U.S. Cl. X.R.

260—348, 454, 465, 468, 514, 544, 557, 563, 566, 586, 598, 617; 424—304, 305

UNITED STATES PATENT OFFICE
CERTIFICATE OF CORRECTION

Patent No. 3,515,740        Dated June 2, 1970

Inventor(s) Orville D. Frampton and Julian Feldman

It is certified that error appears in the above-identified patent and that said Letters Patent are hereby corrected as shown below:

The Heading of the Patent should read as follows:

3,515,740
CYANO CYCLOHEXENYL COMPOUNDS
Orville D. Frampton, 58 W. Charlotte Ave., Wyoming, Ohio 45215, and Julian Feldman, 7511 Sagamore Drive, Cincinnati, Ohio 45236, Assignors to National Distillers and Chemical Corporation, New York, N. Y., a Corporation of Virginia.

SIGNED AND
SEALED
OCT 20 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,515,740      Dated June 2, 1970

Inventor(s) Orville D. Frampton and Julian Feldman

It is certified that error appears in the above-identified patent and that said Letters Patent are hereby corrected as shown below:

Col. 1, line 65: formula II should read:

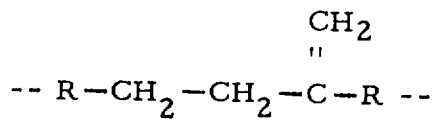

$$-- R-CH_2-CH_2-\overset{\overset{CH_2}{\|}}{C}-R --$$

Col. 4, line 32: line should read:

-- Analysis.—Found (percent): C, 60.93; H, 7.64; N, --

SIGNED AND SEALED
DEC 1 - 1970

(SEAL)
Attest:

Edward M. Fletcher, Jr.
Attesting Officer

WILLIAM E. SCHUYLER, JR.
Commissioner of Patents